(12) United States Patent
Zhu et al.

(10) Patent No.: US 7,155,738 B2
(45) Date of Patent: *Dec. 26, 2006

(54) SYSTEM AND METHOD FOR MANAGING A TRUSTED EMAIL DATASTORE

(75) Inventors: Jing Zhu, Fremont, CA (US); George Hu, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/886,891

(22) Filed: Jul. 8, 2004

(65) Prior Publication Data

US 2005/0097319 A1    May 5, 2005

Related U.S. Application Data

(60) Provisional application No. 60/517,614, filed on Nov. 4, 2003.

(51) Int. Cl.
*H04L 9/00* (2006.01)

(52) U.S. Cl. .............................. 726/4; 726/14; 726/18; 713/154

(58) Field of Classification Search .................... 726/4, 726/18, 14; 713/154; 709/206
See application file for complete search history.

(56) References Cited

U.S. PATENT DOCUMENTS

| 6,052,709 | A  | * | 4/2000  | Paul ........................... 709/202 |
| 6,393,465 | B1 | * | 5/2002  | Leeds ......................... 709/207 |
| 6,421,709 | B1 | * | 7/2002  | McCormick et al. ....... 709/206 |
| 6,453,327 | B1 | * | 9/2002  | Nielsen ....................... 715/500 |
| 6,643,686 | B1 | * | 11/2003 | Hall ............................ 709/206 |
| 6,772,196 | B1 | * | 8/2004  | Kirsch et al. ............... 709/206 |
| 2004/0255122 | A1 | * | 12/2004 | Ingerman et al. ........... 713/176 |

OTHER PUBLICATIONS

U.S. International Searching Authority, Notification of Transmittal of the International Search Report and the Written Opinion of the International Searching Authority, or the Declaration dated Jan. 31, 2006.

* cited by examiner

*Primary Examiner*—Nasser Moazzami
*Assistant Examiner*—Pramila Parthasarathy
(74) *Attorney, Agent, or Firm*—Darby & Darby PC; Jamie L. Wiegand

(57) ABSTRACT

A Trust Email Datastore (TED) system is employed to maintain a list of message addresses with associated trust ratings. The trust rating of a message address is derived from an underlying message address relationship network around the message address of interest through various network related activities such as message sending, forwarding, deleting, blocking, marking as is/is not spam, saving to address book, etc. There may be at least two components of the trust rating between two message addresses. One component of the trust rating, called a relationship trust, may be determined based on proximity of two message addresses in a message address relationship graph. Another component of the trust rating is substantially independent of the positions of two message addresses in the message address relationship graph, and is referred to as a universal trust rating. The trust rating components can be combined and employed for spam filtering.

30 Claims, 8 Drawing Sheets

SYSTEM AND METHOD FOR MANAGING A TRUSTED EMAIL DATASTORE

CROSS REFERENCE TO RELATED APPLICATIONS

This application claims the benefit of U.S. Provisional Application Ser. No. 60/517,614 filed on Nov. 4, 2003, the benefit of the earlier filing date of which is hereby claimed under 35 U.S.C. § 119 (e) and further incorporated by reference.

FIELD OF THE INVENTION

The present invention related generally to networks, and more particularly to reducing unsolicited electronic messages from unknown senders.

BACKGROUND OF THE INVENTION

Over the last decade, with the advent of the web interface to mail, email-based communication has become a major method of human interaction in the digital world. An email address has increasingly become an important digital identity for many online activities e.g., communicating with friends, participating in discussion groups, and shopping on the web.

However, along with the benefits, email-based communication has come several negative aspects. For example, today, unsolicited and unwanted email (spam) has become a wide spread problem due in part to the ease and low cost of sending spam to millions of email addresses. These unwanted emails waste the time, money, and resources of end users and service providers. In the past, there have been relatively low barriers to spamming, making it difficult to filter out the unsolicited, unwanted messages.

Therefore, there is a need in the industry to enable a more effective approach to managing unwanted email communications. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
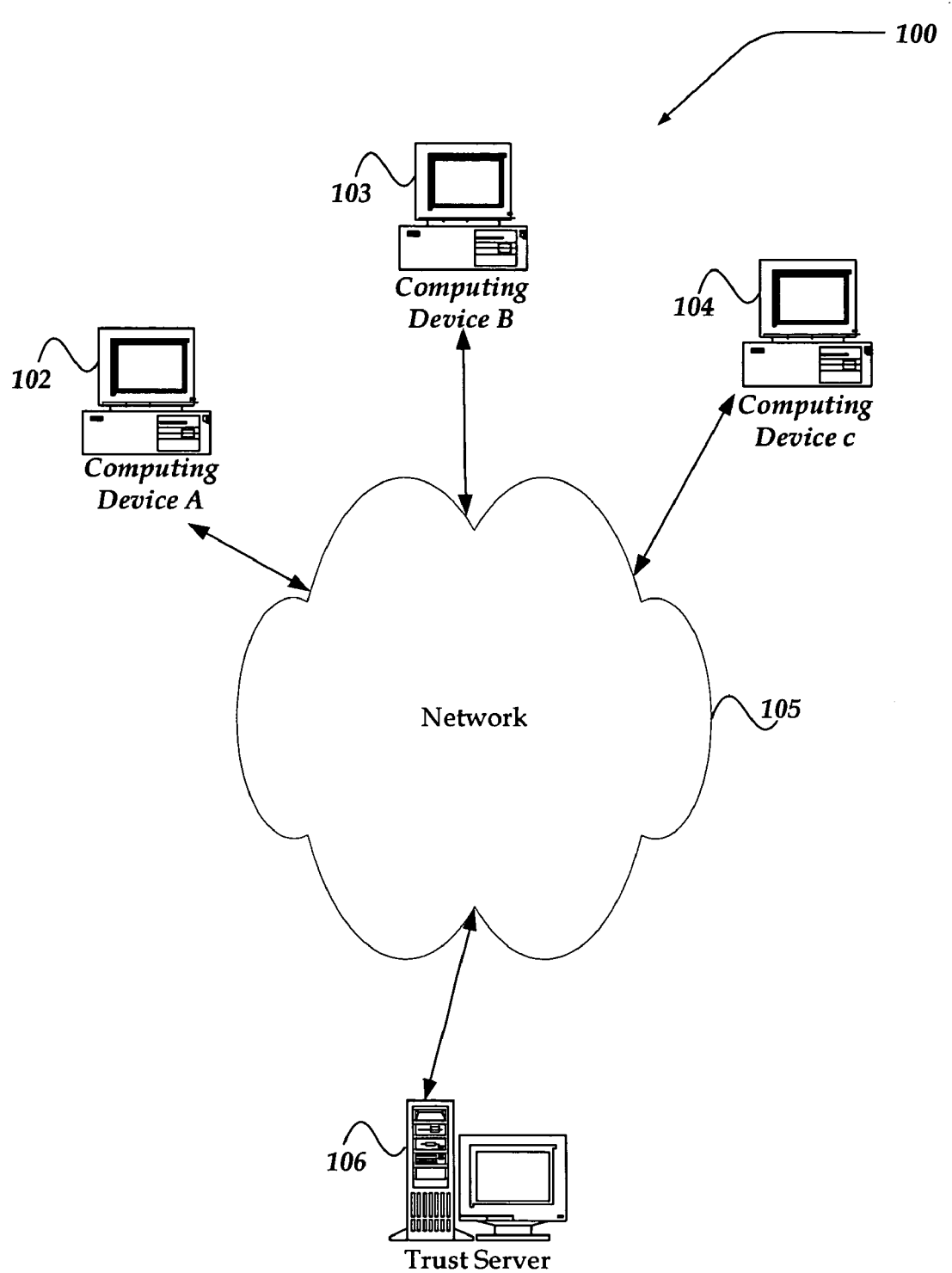
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the terms "a," "an," and "the" include plural references. The meaning of "in" includes "in" and "on." The term "or" is an inclusive "or" operator, and includes the term "and/or," unless the context clearly dictates otherwise.

The phrase "in one embodiment," as used herein does not necessarily refer to the same embodiment, although it may. The term "based on" is not exclusive and provides for being based on additional factors not described, unless the context clearly dictates otherwise.

The terms "comprising," "including," "containing," "having," and "characterized by," include an open-ended or inclusive transitional construct and does not exclude additional, unrecited elements, or method steps. For example, a combination that comprises A and B elements, also reads on a combination of A, B, and C elements.

Briefly stated, the present invention is directed towards managing a trust rating for a message address including an email address, a domain, and the like, based, in part, on a relationship with another message address in a predetermined community. A trusted email datastore (TED) may be employed to maintain a list of message addresses with their associated trust ratings. The trust rating of a message address may be determined based on a variety of mechanisms, including, but not limited to, an underlying message address relationship network around the message address of interest, through various online activities such as message sending, forwarding, deleting, blocking, marking as is/is not spam, saving to an address book, and the like. In one embodiment, there are at least two components of the trust rating between two message addresses. One component of the trust rating employs proximity between two message addresses in a message address relationship graph, which may be referred to as a message address relationship trust. Another component of the trust rating provides a trust value that may be substantially independent of a position of two message addresses in the message address relationship graph, which is also referred to as a universal trust rating. These trust rating components and others, may be combined and employed for use such activities as spam filtering, and the like. Techniques for deriving these trust values are discussed in greater detail below.

The TED system described below is directed towards providing several benefits. For example, it is anticipated that messages from trusted message addresses, such as a friend's message address, or the like, may be eligible for safe deposit into one's message inbox employing the TED system. It is anticipated that message address based filtering of the TED system may reduce a load on a content based filtering system and thereby improve a performance associated with the content-based filtering system. Additionally, it is anticipated that a reduction in a false positive rate may result that may be caused by other spam filtering mechanisms, such as content filtering, or the like. The TED system is also directed at making it more difficult for a spammer to garner a relationship trust as their spamming behavior would tend to prevent large scale spamming efforts.

Similarly, a TED system may be configured to be automatically managed by a service provider, such that an end-user may not have to manage message filtering directly, other than perhaps marking a message as spam, non-spam, and the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102–104, network 105, and trust server 106. Network 105 enables communication between client devices 102–104, and trust server 106. Although not illustrated, there may be many more or less client devices than shown. Moreover, client devices may be organized based on a variety of criteria, including, but not limited to, a domain association, group association, or the like.

Generally, client devices 102–104 may include virtually any computing device capable of connecting to another computing device to send and receive a message. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client devices 102–104 may be any device that is capable of connecting using a wired or wireless communication medium such as a PDA, POCKET PC, wearable computer, and any other device that is equipped to communicate over a wired and/or wireless communication medium.

Each client device within client devices 102–104 typically includes a message user agent (MUA), or the like, that is configured to enable it to communicate an electronic message with another client within client devices 102–104. MUAs employed may include, but are not limited to, Eudora, Outlook, ELM, PINE, and the like. Client devices 102–104 may further include a message transfer agent (MTA) such as sendmail, or the like, that forwards the electronic message, to a message server, mail server, and the like. For example, the MTA may be configured to communicate electronic mail messages employing trust server 106.

Each client device within client devices 102–104 may have associated with it at least one message address with which it employs to send and receive electronic messages. Each message address may include a sequence of one or more characters that identifies an electronic post office box on a network where an electronic message may be sent. Different types of networks may employ different formats for the message address. On the Internet, for example, message addresses typically employ the format as described in Request for Comments 822 (RFC822). One example of an Internet message address is: john.doe@yahoo.com.

Client devices 102–104 may further include a client application, and the like, that is configured to manage various actions on behalf of the client device.

Network 105 is configured to couple each client device within client devices 102–104, and the like, with every other client device, and with trust server 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lihes (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 102–104 and trust server 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Trust server 106 is described in more detail below in conjunction with FIG. 2. Briefly, however, trust server 106 includes virtually any network device configured to manage a trusted email datastore (TED) for use in detecting unsolicited, unwanted electronic messages. As such, trust server 106 may be implemented on a variety of computing devices including personal computers, desktop computers, multiprocessor systems, microprocessor-based devices, network PCs, servers, proxy servers, reverse proxy servers, gateways, network appliances, and the like.

Trust server 106 may further include MTA services that enable messages to be stored and transferred between computing devices, such as client devices 102–104, and the like. Trust server 106 may include a message store that holds messages until they are selectively retrieved, deleted, or the like. Messages may be stored and routed employing any of a variety of delivery protocols, including, but not limited to Simple Mail Transfer Protocol (SMTP), Post Office Protocol (POP), Internet Message Access Protocol (IMAP), and the like.

Trust server 106 is further configured to determine information associated with client devices 102–104, domains associated with client devices 102–104, and the like. For example, trust server 106 may gather message addresses associated with client devices 102–104 and relationship information between client devices 102–104. Trust server 106 may determine a strength of a relationship, as well as a trust associated with the relationship, and the like. Trust server 106 may further enable a client device to employ the determined information to determine whether a message is unsolicited, unwanted, SPAM, or the like. Trust server 106 may, for example, employ the processes described in more detail below in conjunction with FIGS. 7–8 to enable the TED system.

Illustrative Server Environment

Figure 2:
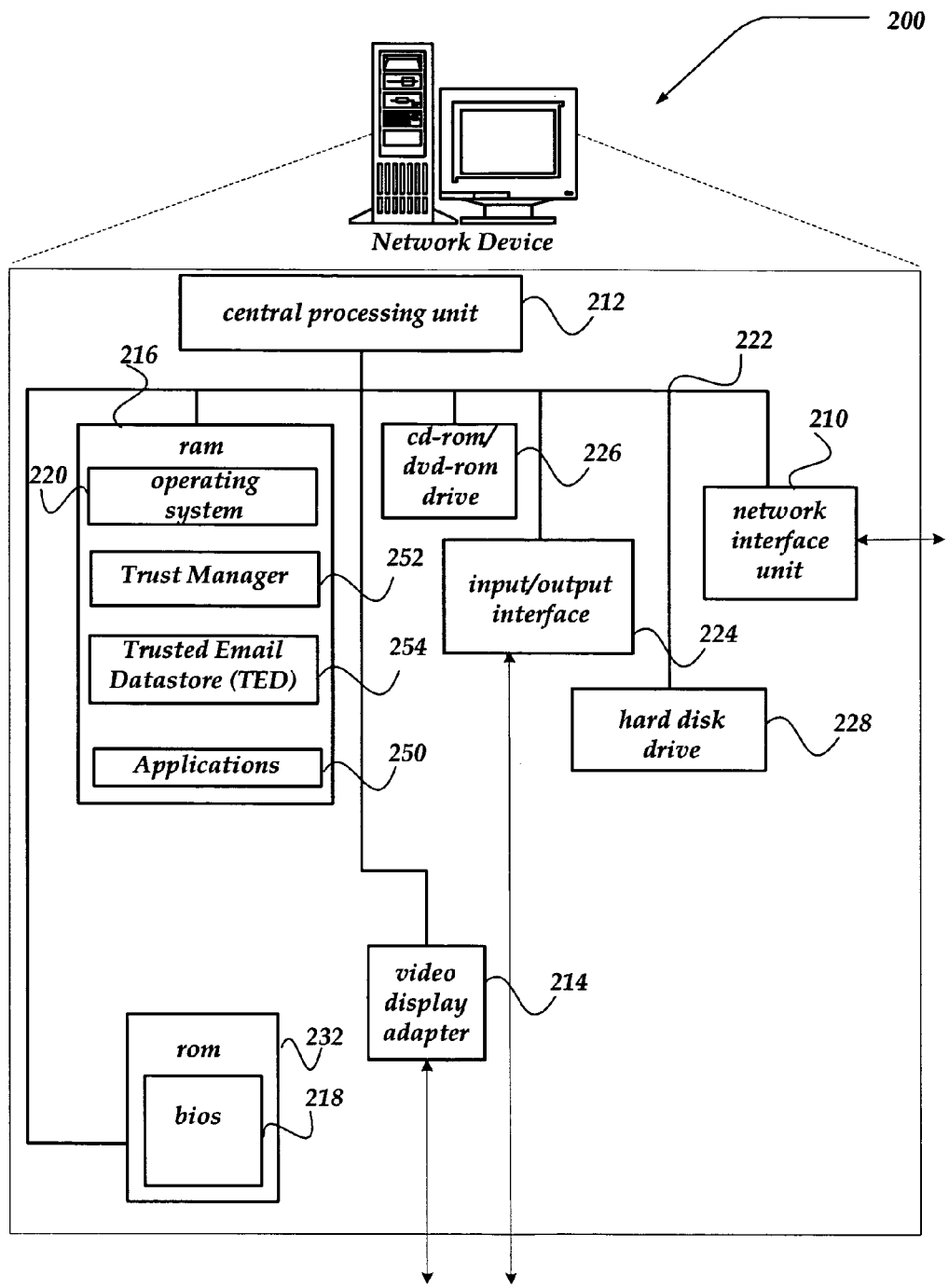
FIG. 2 shows one embodiment of a server device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, trust server 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, SMTP applications, mail services, security programs, spam detection programs, and so forth. Mass storage may further include applications such as trust manager 252 and trusted email datastore (TED) 254.

TED 254 may include a database, file, spreadsheet, application, folder, and the like, that is configured to receive and store trust information associated with a client device, domain, and the like. TED 254 may receive such trust information from trust manager 252.

Although TED 254 is illustrated as a single component, this need not be the case. For example, where the amount of information collected and stored in TED 254, is expected to be fairly large, TED 254 may be implemented across a distributed structure, such as a distributed database, across several servers, or the like.

Trust manager 252 is configured to manage a client device's message address trust information and store such trust information in TED 254. Trust manager 252 may receive and store message addresses and their relationships within TED 254. Trust manager 252 may further gather information associated with message addresses, messengers, groups, and the like, and determine a relationship strength between message addresses, groups, and the like.

Trust manager 252 may be configured to gather the information based on a variety of mechanisms, including, when a new message address is registered with it, based on a predetermined schedule, condition, event, and the like. In one embodiment, a fast trust rating query interface may be employed to gather the information at a frequency that is directed towards supporting time critical applications, and the like.

Trust manager 252 may also determine an electronic message address relationship trust between message addresses, groups, and the like. Trust manager 252 may further determine a universal trust rating for a message address based, in part, on a message address relationship trust, existence of a trust rating card, and the like. For example, if spam behavior is detected for the message address, a negative trust rating may be assigned to that message address, or the like, and stored in the trust rating card.

Trust manager 252 may further enable a client device, such as client devices 102–104 of FIG. 1, to subscribe to the TED system and query information from the TED system. Such queried information may include, for example, a composite trust value that the client device may employ to determine whether to accept a message, reject the message, or the like. Trust manager 252 may include one or more components, modules, programs, and the like, to enable the above actions.

Although illustrated in FIG. 2 as distinct components, trust manager 252 and TED 254 may be arranged, combined, and the like, in any of a variety of ways, without departing from the scope of the invention. For example, components of trust manager 252 may be deployed distinctly. Moreover, components of trust manager 252, TED 254, and the like, may reside in one or more computing devices similar to network device 200.

Network device 200 may also include an SMTP, POP3, and IMAP handler applications, and the like, for transmitting and receiving electronic messages; an HTTP handler application for receiving and handing HTTP requests; and an HTTPS handler application for handling secure connections.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, datastores, and the like.

Trust Information

In mirroring human society, a relationship between message addresses may be employed to represent communities based on various network related activities. Such a community/relationship network may enable, in part, a trust rating for message addresses or domains.

An electronic message address relationship may include a directional relationship of one message address to another message address through a network related activity. For example, message address B may receive and read a message from message address A. Message address A then may be related to message address B in the direction A->B. Similarly, if message address B replies to message address A and message address A reads a reply message, then message address B may be related to message address A in the direction A<-B.

One strength of a relationship between two message addresses may include a weighted index for a possible interaction. The strength may be positive or negative depending on how message addresses interact with each other. For example, if message address A sends a message to message address B and message address B reads the message and saves to the personal folder, message address A may be said to have a positive relationship with message address B. Similarly, if message address B blocks the messages from message address A, then message address A may have a negative relationship to message address B. However, the invention is not limited to this convention, and virtually any other convention designating the strength of a relationship may be employed without departing from the scope or spirit of the invention.

Figure 3:
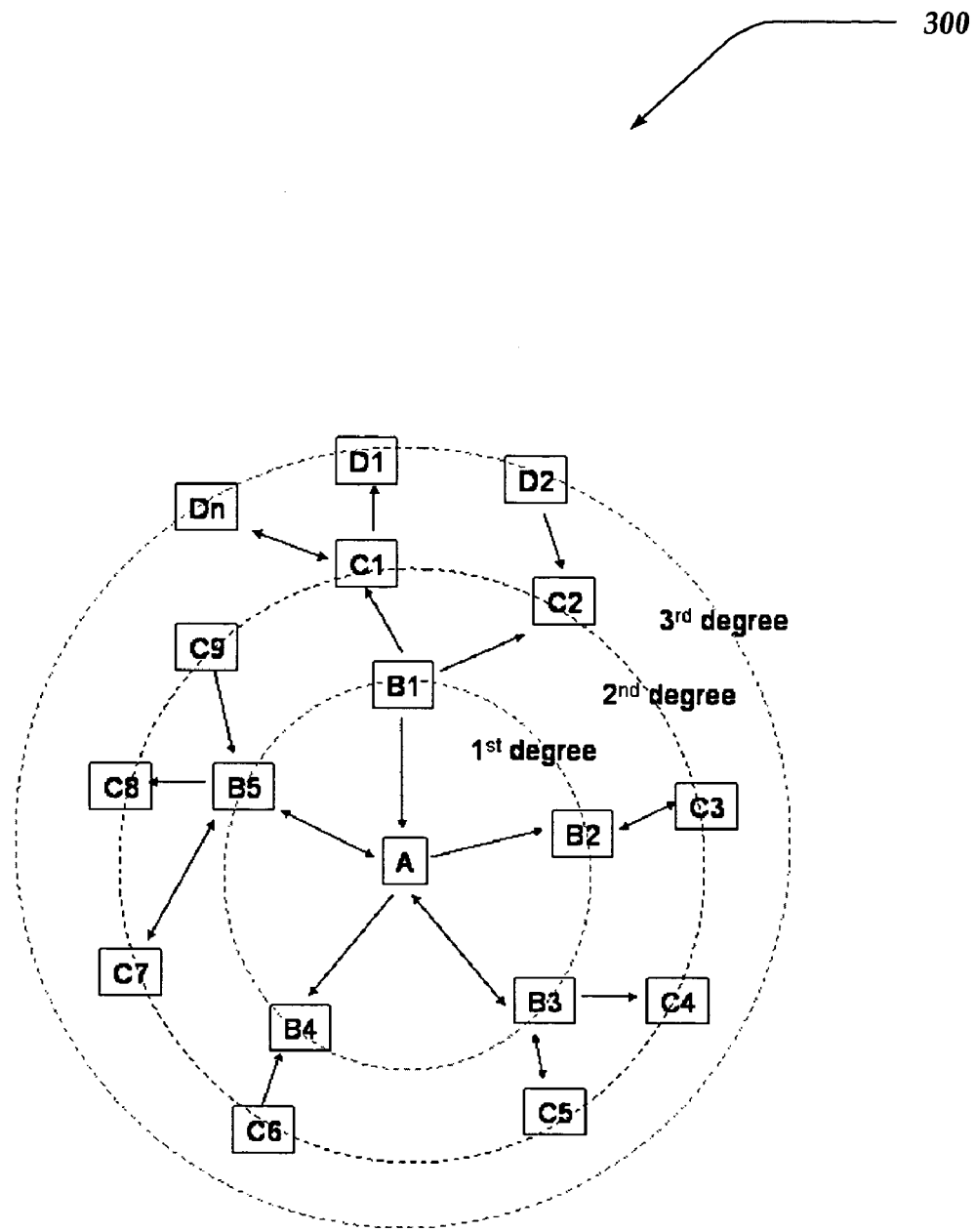
FIG. 3 illustrates one embodiment of a message address relationship graph.

FIG. 3 illustrates one embodiment of a message address relationship graph, according to the invention. Shown in the figure is one example of interactions between message addresses A, B1–B5, C1–C9, and D1–Dn. The illustrated example of interactions of the message addresses form what may be known as a directional graph. The directional graph may be employed to determine relationship information for a given message address. As shown in the figure, the directional graph has message address A as a focal point, with message addresses B1–B5, C1–C9, and D1–Dn arranged to represent their relationship with respect to each other and to message address A. A degree of separation between message addresses may then be determined from directional graph 300.

A degree of separation may be defined as how far two message addresses are separated on the directional graph. For example, as shown in FIG. 3, message addresses A->B->C1–C9->D1–Dn. Also seen is that message addresses A and B have one degree of separation. Similarly, message addresses A and C1–C9 have two degrees of separation, and message addresses A and D1–Dn have three degrees of separation. Typically, as degrees of separation for two message addresses get larger in magnitude, a possible relationship strength between them may become weaker.

Based on an action between two message addresses a message address relationship trust may be determined. The message address relationship trust may include a binary variable that represents how much message address A, for example, is trusted by another message address, such as B, based on their relationship.

Similarly, based, in part, on interactions of a message address with its peers in a networked community, a message universal trust rating may be determined. The message universal trust rating may include a unary variable representing how much a message address is rated by its peers in the networked community.

Additionally, a message address cluster may be defined based on message addresses that have a non-negligible and positive relationship strength. The message address cluster may represent a digital bubble around a set of message addresses in the networked community.

Exemplary Model for Electronic Message Address Relationship Trust

If message address A is positively related with message address B (A->B), A may be considered to be somewhat trusted by B. This may be because B finds A's message valuable. If B is also positively related with another message address, say C1 (B->C1), then B may be said to be somewhat trusted by C1. From this, A may be trusted by C1 in some way even though A and C1 have not interacted in the past. Thus, if A sends a message to C1, C1 might be able to treat A's message with some level of preference. Various models may be employed to describe this trust relationship between message addresses, and similarly, to determine a message address trust based on a relationship strength.

A relationship trust between message addresses A and B may be represented by T(A, B). A relationship strength between message addresses A and B from various activities may be represented by S(A,B). Both relationship trust T(A,B) and relationship strength S(A,B) may be normalized so that their values range is from 0 to 1.

One embodiment of a model that may be employed to determine relationship trust T(A, B) from the relationship includes a step model, such as:

$T(A,B)/T\text{norm}=1$, if degree $(A,B)<$cut off degrees of separation $T(A,B)/T\text{norm}=0$, if degree $(A,B)>=$cut off degrees of separation A community-based green list, or the like, may employ this step model. For example, in a typical community-based green list all message addresses Bs connected to message address A are typically assigned a constant relationship trust value within the cut off degree. While this model is very simple, it may not adequately account for a trust decay between a first degree and a second degree separation up to the cutoff degree of separation. It also may not adequately address that trust should be enhanced if more than one of message address A's first degrees know and trust message address B.

Another embodiment of a trust model is next presented that may better represent real life scenarios. If message address A is positively related to message address B (that is, A->B) with a relationship strength S(A,B), then relationship trust T(A,B) may be proportional to relationship strength S(A,B). The reverse may also be true. The following property may then be employed to determine relationship trust T(A,B) from relationship strength S(A,B):

$$T(A,B)/S(A,B)=T(B,A)/S(B,A).$$

T(A,B) may be determined from S(A,B) as:

$$T(A,B)=a*S(A,B),$$

where a is a constant.

However the above may not adequately account for any loop back effect of relationship strength S(B,A) on relationship trust T(A, B). Therefore, a renormalized approach is proposed:

$$T(A,B)=S(A,B)*[1+b*S(A,B)*S(B,A)],$$

where b is a constant.

If S(A,B) is zero, then T(A,B) will also be zero.

Figure 4:
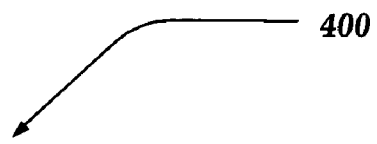
FIG. 4 illustrates one example of two degrees of separation between two message addresses.
Figure 4:
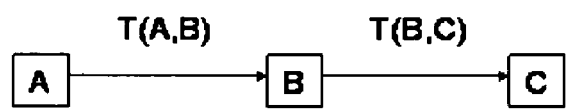

With the relationship trust T determined between two directly connected message addresses, another model may be employed to determine relationship trust T between any two message addresses on the message address relationship graph, such as shown in FIG. 3. For example, FIG. 4 illustrates relationship graph 400 showing two degrees of separation between two message addresses A and C. Here, message addresses A and C are connected through another message address, B. The other model may be employed to capture the following observations:

(1) if T(A,B) increases/decreases, T(A,C) may also increase/decrease;

(2) if T(B,C) increases/decreases, T(A,C) may also increase/decrease;

(3) a change in T(A,B) or T(B,C) may also be reflected similarly in T(A,C);

(4) a relationship trust between A and C will likely decay proportionally as the degree of separation increases; and (5) an order of computation from serialization of message addresses may have relatively little impact on the relationship trust. That is, if A->B->C->D, then $$T(A,D)=f\{T(A,C),T(C,D)\}=f\{(T(A,B),T(B,D)\}$$

These observations may be reflected by:

$$T(A,C)=T(A,B)*T(B,C)/Tnorm,$$

where Tnorm includes a normalization factor directed towards providing a fast decaying relationship trust T for increasing degrees of separation.

For message addresses separated by multiple degrees, such as where message addresses A and D are separated by A->B_C1–C9_D1–Dn, as shown in FIG. 3. Then relationship trust T, between message addresses A and D may be determined as:

$$T(A,D)=T(A,B)*T(B,C)*T(C,D)/Tnorm/Tnorm.$$

Since T/Tnorm includes a value in the range [0,1], and is usually, but not necessarily, closer to 0 than 1, the value of relationship trust T is anticipated to decay approximately geometrically with the degree of separation between any two message addresses for the serialized connection.

Figure 5:
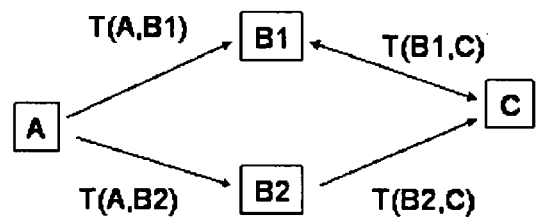
FIG. 5 illustrates another example of two degrees of separation between two message addresses.

As shown in FIG. 5, relationship graph 500 shows another example, where message addresses A and C are also separated by two degrees. However, unlike the relationship graph of FIG. 4, message addresses A and C are now connected through two first degree message addresses, B1 and B2.

From the illustrated relationship, a relationship trust may be determined between message addresses A and C based on the following observations:

(1) if T(A,B1) or T(B1,C) increases/decreases, T(A,C) increases/decreases;

(2) if T(A,B2) or T(B2,C) increases/decreases, T(A,C) increases/decreases; and (3) an existence of an extra interaction route may also result in an increase in T(A,C).

From these observations, another embodiment for relationship trust T(A,C) may include adding relationship trust T(A,C) through B1 route and relationship trust T(A,C) through the B2 route, so that:

$$T(A,C)=T(A,C) \text{ via } B1+T(A,C) \text{ via } B2,$$

where $$T(A,C) \text{ through } B1=T(A,B1)*T(B1,C), \text{ and}$$

$$T(A,C) \text{ through } B2=T(A,B2)*T(B2,C).$$

From the above:

$$T(A,C)=T(A,B1)*T(B1,C)+T(A,B2)*T(B2,C).$$

However, the invention is not constrained to this relationship, and others may be employed. For example, relationship trust T(A,C) may include a weighted sum of the routes, without departing from the scope or spirit of the invention.

Universal Trust Rating (UT) for Message Address:

Most of the message addresses are not used for Spam. A model based solely on a relationship trust is likely to be less effective than where the sender is trying to send a message to a destination that is not in its close proximity in the relationship graph, even though it is not Spam. Therefore, a universal trust rating (UT) has been developed and may be assigned to message addresses so that universally trusted message addresses can be used. UT is a property of the sender message address, and typically is not dependent on the recipient message addresses. Therefore, it is useful when the sender message address can be verified. Otherwise, a spammer can simply fake the sender address to be a universally trusted address and potentially destroy the trust rating for the address. This is somewhat different from the relationship trust, as even without the sender identification or verification, relationship trust can still be used effectively. In order to abuse the relationship trust, the spammer has to guess message address that is in close proximity to the recipient message address. It is a much more difficult task for the spammer.

Universal trust rating UT can be "derived" from the message address relationship graph. For example, if a message address is a trusted "through relationship" by a number of "universally trusted" message addresses, then this message address may also be "universally trusted." This universal trust rating UT may be represented as a unary variable, and the like. In one embodiment, universal trust rating UT is derived from a weighted average of the universal trust rating UT of message addresses of its community.

For example, suppose universal trust rating UT(A) is the universal trust rating for message address A. Then, $$UT(A)=\text{SUM}(UT(B)*T(B,A) \text{ if } UT(B)>0, UT(B)*T(A, B) \text{ if } UT(B)<0 \text{ and}$$

$$T(A,B)>0)/\text{SUM}(abs(T(A,B)) \text{ if } UT(B)>0, T(A,B) \text{ if } UT(B(A,B)>0).$$

The sum for the above equation is over message address B, where message address B may be any one of the message addresses connected to message address A. An asymmetry with respect to universal trust rating UT(B) positive/negative values may exist that is due at least in part to the following arguments:

(1) If UT(B)>0, it will have a positive impact on A's trust rating if B vouch for A;

(2) If UT(B)<0, A's trust rating may be affected if A vouched for B, but not vice versa; and (3) If UT(B)>0, A can be negatively impacted if T(B, A) is negative. Negative T may occur, for example, where B complains about A's message, such as "this is Spam" and/or block A's address.

If message address A sends a message to a message address Z that is beyond the cut-off degree for the relationship trust, the relationship trust T(A, Z) would have zero value. However, since message address A has a good universal trust rating UT(A), message address Z would treat message address A with universal trust rating UT(A). In general, given any two message addresses A and Z, how trustful message address A is to message address Z may be described by composite trust value CT(A,Z), where $$CT(A,Z)=UT(A)+T(A,Z).$$

There are a variety of other approaches to derive the universal trust rating for a message address, including employing an association of a message address with a valid trust rating card number, a telephone number for a mobile device, or the like. For example, composite trust value CT(A,Z) may also be determined based, in part, on a weighted sum by:

$$CT(A,Z)=a*UT(A)+b*T(A,Z),$$

where a and b are constants.

For new message addresses, because they may not have many relationships with other message addresses, their universal trust rating UTs may be subscribed to by end users and service providers. Moreover, universal trust rating UT may be set to a negative value for a spammer's message addresses if spamming activities are detected from these message addresses.

A trust rating may also be applied to message domains. If all of the message addresses in a domain have positive trust ratings the domain could be assigned a positive trust rating as well. A new message address from a domain with a good trust rating could be assigned a good trust rating by default. For example, yahoo-inc.com could be given a default positive trust rating, and all message addresses in that domain will have a default positive trust rating. This default good trust rating for a specific domain could be revoked, if a predetermined number of the message addresses within that domain have negative trust ratings.

Figure 6:
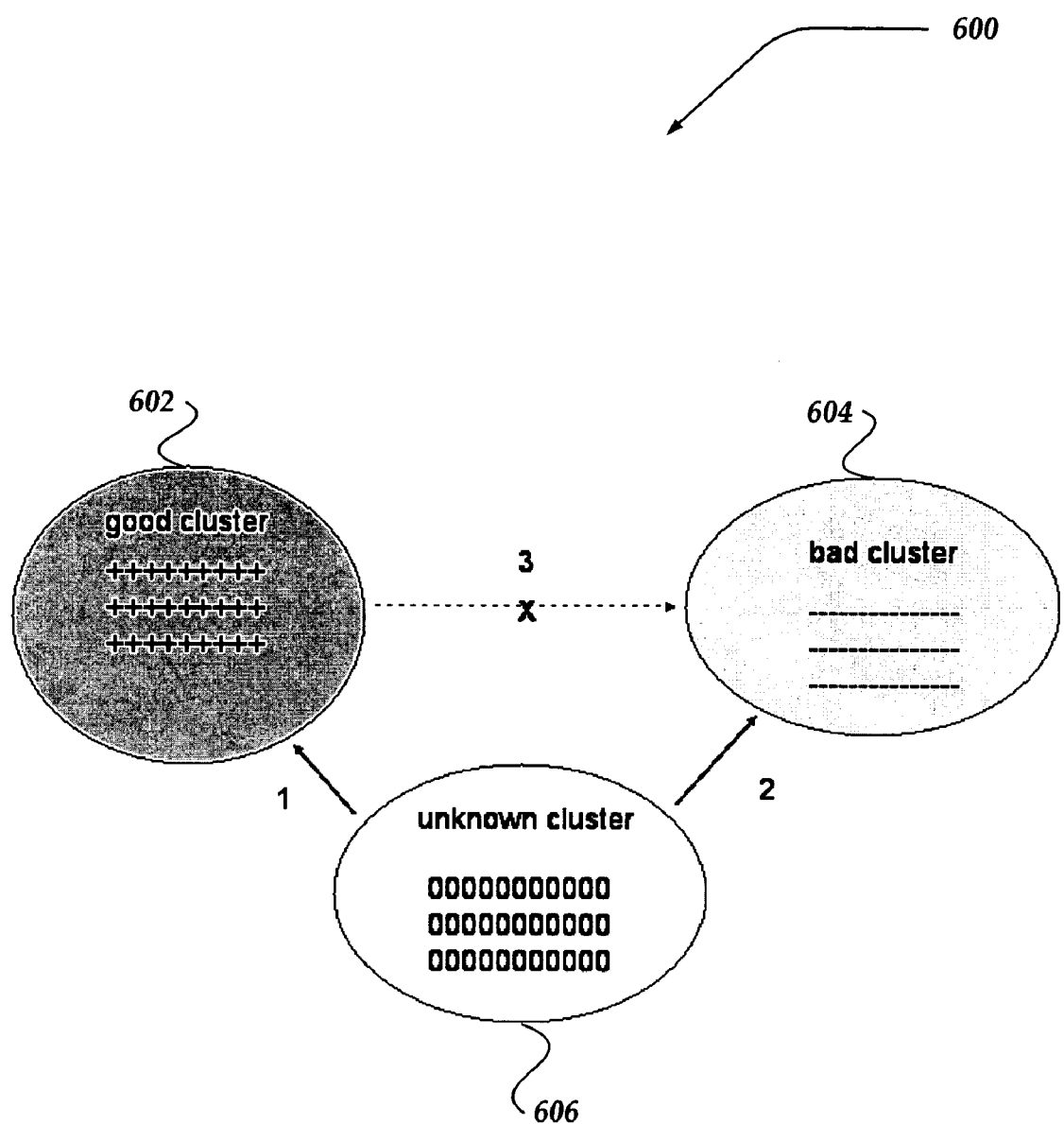
FIG. 6 illustrates one embodiment of another message address relationship graph illustrating a grouping for universal trust ratings.

Good and Bad Message Address Clusters:

From a few seed message addresses with good universal trust rating UT and bad universal trust rating UT, a message graph may evolve that reaches a self-consistent state with most of the message addresses being segregated into three types of clusters: good clusters, bad clusters, and unknown clusters, or the like. FIG. 6 illustrates one embodiment of a message address graph 600 illustrating one such grouping for universal trust ratings. However, the invention is not so limited, and other relationship clusters may be employed without departing from the scope of the invention.

As illustrated in FIG. 6, good cluster 602 may be formed by message addresses and/or domains with good universal trust ratings. Similarly, bad cluster 604 may be formed, for example, by a spammer address with a negative universal trust rating UT. However, bad cluster 604 may also be formed based on other criteria resulting in a negative universal trust rating UT. As shown in the FIG. 6, unknown cluster 606 may include message addresses with universal trust rating UTs that are substantially neutral and may be formed, for example, based on first impression (new) message addresses and/or domains, infrequently used message addresses, addresses that are confused (associating themselves both with good message addresses and bad message addresses), and the like. The threshold for identifying a good universal trust rating UT versus a bad universal trust rating UT can be arbitrary, but it may affect the size of the good, bad, and unknown clusters.

In one embodiment of an initial build out phase of the message address relationship graph, most of the message addresses may reside in unknown cluster 606. However, as message traffic is accumulated, more and more unknown message addresses may garner sufficient network traffic to be classified as good or bad message addresses. Thus good and bad clusters (602 and 604) may then grow until the cluster topology reaches a substantially steady state.

Various methods may be utilized to reach a self-consistent solution. Some techniques discussed below may be employed to speed up the solution:

(1) if message address A with a good universal trust rating UT(A) has a positive relationship trust T(A,B) with message address B, then message address B's universal trust rating UT(B) may be increased by an amount, say 0.1*UT(A)*T(A,B). This mechanism is directed towards assisting good cluster 602 to expand, e.g., some message addresses in unknown cluster 606 may be pulled into good cluster 602.

(2) if message address A in good cluster 602 has a negative relationship trust with message address B from actions like blocking, spam voting, or the like, then message address B's universal trust rating UT(B) may be deducted by an amount, say 0.1*UT(A). This mechanism is directed towards assisting bad cluster 604 to expand, e.g., some message addresses in unknown cluster 606 may be pulled into bad cluster 604. Briefly stated, a negative universal trust rating UT can be given by an entity with a good universal trust rating UT to another entity.

(3) if message address A has some positive relationship trust with message address B in bad cluster 604, then message address A's universal trust rating UT(A) may be deducted by an amount 0.1*UT(A)*S(A,B). This mechanism is directed towards cutting off positive relationship links between good cluster 602 and bad cluster 604.

Generalized Operation

Figure 7:
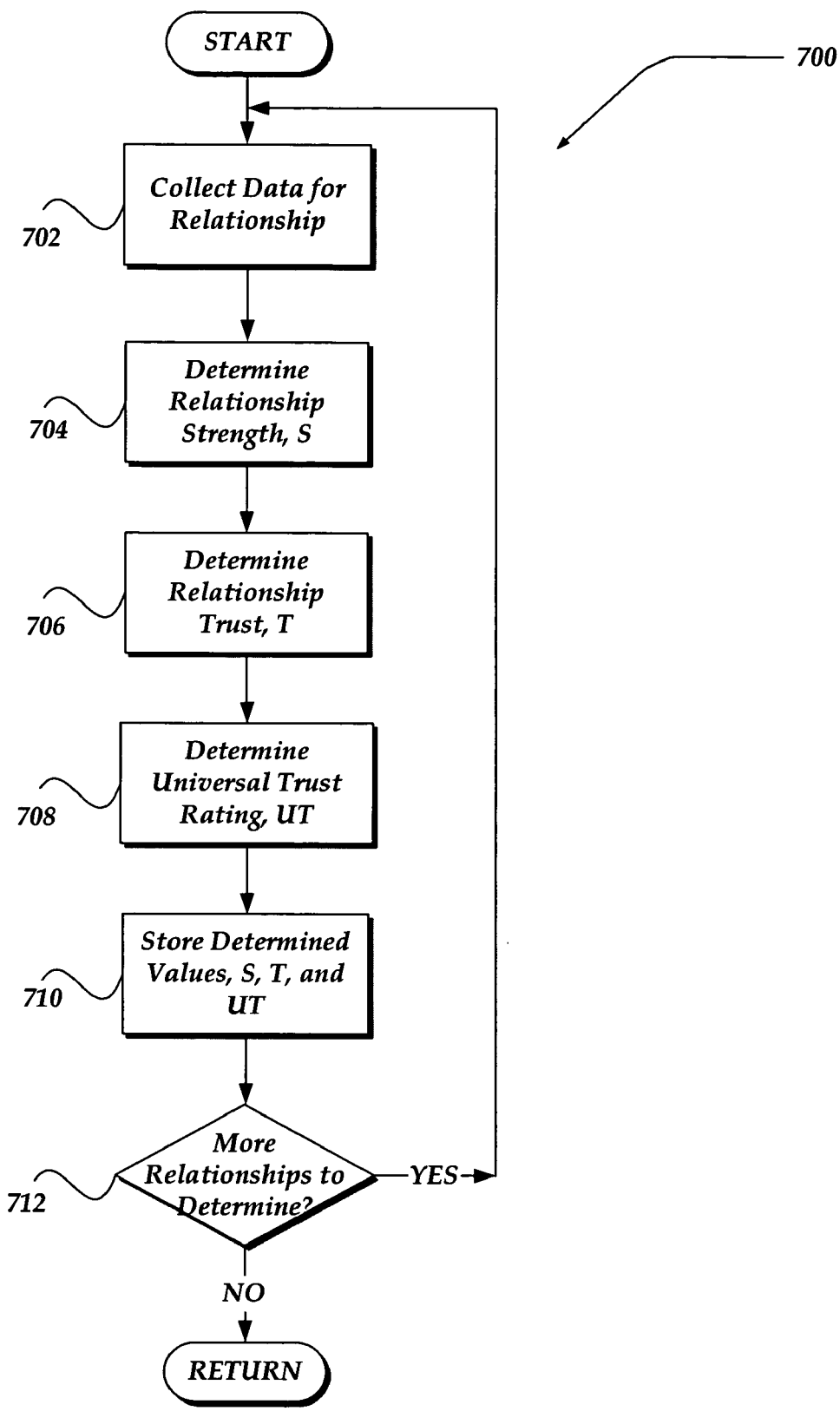
FIG. 7 illustrates a logical flow diagram generally showing one embodiment of a process for managing a Trusted Email Datastore (TED)

The operation of certain aspects of the invention will now be described with respect to FIGS. 7–8. FIG. 7 illustrates a logical flow diagram generally showing one embodiment of a process for managing a Trusted Email Datastore (TED). TED process 300 of FIG. 7 may be implemented within trust server 106 of FIG. 1.

Process 300 begins, after a start block, at block 702 where data is collected for the determination of relationship information. Such data may include message addresses, domain addresses, and the like. Data collection may also include, but is not limited to, information obtained from an address book associated with a message address, a buddy list, message addresses saved in a personal folder, an inbox, a reply mailbox, a delete box, and the like. Data collection may further include characteristics about message addresses, including whether the message address is associated with an active group, domain, whether a recipient accepted, rejected, deleted, read, or the like, a message from a message address, and the like. In one embodiment, the collected data is stored in a datastore, such as TED 254 of FIG. 2.

Processing proceeds then block 704 where a relationship strength, S, may be determined between two message addresses. A variety of mechanisms may be employed to determine the relationship strength. For example, in one embodiment, the relationship strength between two message addresses A and B may be determined as follows:

(1) if message address A is in message address B's address book, S(A,B) may be incremented by some value. In one embodiment, it is incremented by about 0.9.

(2) if message address A is in message address B's buddy list, or the like, S(A,B) may be incremented by some other value. In one embodiment, it is incremented by about one.

(3) if message address A's message is saved by message address B in the personal folder, or the like, S(A,B) may be incremented by still another value. In one embodiment, it is incremented by about 0.6.

(4) if message address B sends a reply message to message address A, say twice, or some other value greater than one, within some predetermined period of time, S(A,B) is incremented by yet another value. For example, if the reply is received within say, one month, then S(A,B) may be incremented by about 0.5.

(5) If message addresses A and B both belong to an active group, or the like, that is within a predetermined size, S(A,B) is incremented by still another value. For example, if the active group is less than some value, say about 100, then increment S(A,B) by about 0.5.

The invention is not constrained by the above, and virtually any other criteria, process, and the like, may be employed to determine S(A,B). For example, a negative action, such as reporting message from message address B, will decrement S(A,B).

Process 700 flows next to block 706, where the relationship trust, T, is determined between message addresses within the TED, as described above. Processing flows next to block 708, where the universal trust rating, UT, for each message address within the TED is determined as described above.

Process 700 flows to block 710 where the values determined at blocks 704, 706, and 708, for relationship strengths S, relationship trusts T, and universal trust rating UT, are stored in the TED. Processing flows next to decision block 712, where a determination is made whether there are any more message addresses and associated relationships to determine. This may arise, for example, where more message addresses need to be considered for inclusion in the TED.

As the effectiveness of the TED system improves with the percentage of network traffic that it sees, it is desirable, although not required, that a large percentage of the network message addresses be included in the TED system. However, as this may be impractical, one embodiment is to include a majority of message addresses from a major message service provider. However, the effectiveness of the TED system may be improved may other mechanisms, without departing from the scope of the invention. For example, one may establish guidance for the TED system, such that if the average of first degree of separation for users of the TED system is N, then users for the TED system might account for about 1/N of the internet message addresses with which these users interact.

Several other considerations may be included at decision block 712. A message address may arise that is associated with a super node, such as a distribution list, buddy list, message lists, and the like. Such super nodes result in some message addresses in the network being associated with a large number of message addresses. To improve the efficiency of the TED system, it may be desirable to prune some message addresses and relationships associated with these super nodes. Thus, some message addresses and their relationships may be excluded from the TED.

Similarly, at decision block 712, a message address may be found that includes a message alias, such as where a message address and message aliases is associated with a same address book, buddy list, mail folder, or the like. In such situations it may be desirable to treat them as a single message address in the TED.

Where a message address in the network includes disposable message addresses, temporary message addresses, and the like, it may be desirable to distinguish these message addresses from the TED system generated from primary message addresses, aliases, and the like. This may improve the quality of the TED system as such disposable message addresses, temporary message addresses, and the like, may be more prone to be associated with spam related activities.

In any event, if there are more message addresses and relationships to determine, processing branches back to block 702 to proceed as described above; otherwise, processing returns to a calling process, to perform other actions.

Figure 8:
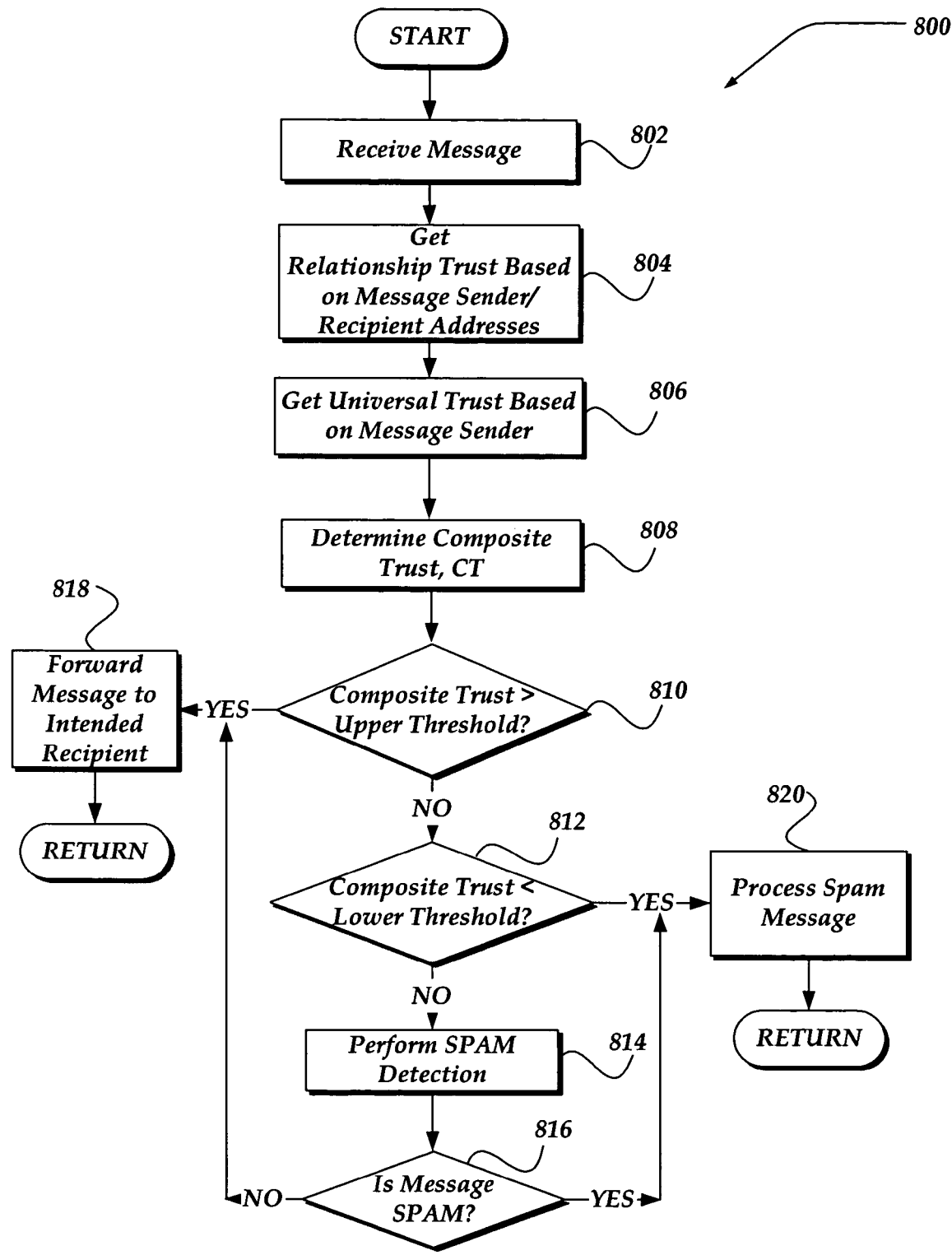
FIG. 8 illustrates a logical flow diagram generally showing one embodiment of a process for employing the results of the TED process of FIG. 7 to manage incoming messages, in accordance with the invention.

FIG. 8 illustrates a logical flow diagram generally showing one embodiment of a process for employing the results of the TED process of FIG. 7 to manage incoming messages. Process 800 of FIG. 8 may be implemented in a trust server, such as trust server 106 of FIG. 1.

Process 800 begins, after a start block, at block 802 where a message is received. The message may have been sent from a message address that is included within the TED generated by the process described above in conjunction with FIG. 7. However, the invention is not constrained to receiving only messages from message addresses in the TED.

Processing proceeds to block 804, where a relationship trust T, is obtained based on the message addresses of the message sender and its recipient. If either of the message addresses is not in the TED, then the relationship trust may be set to some value, such as zero. Additionally, the missing message address(es) may be forwarded for addition in the TED. If both message addresses of the message sender and recipient are in the TED, then relationship trust T may be obtained from the TED. Processing next proceeds to block 806, where universal trust rating UT, is obtained. Again, if the message address is not in the TED, then universal trust rating UT may be set to some value, such as zero, negative one, or the like. In any event, processing proceeds to block 808 where composite trust CT, may be determined as described above. Processing continues next to decision block 810.

At decision block 810, a determination is made whether composite trust CT for this message sender is greater than some upper threshold value. The upper threshold may be predetermined to be virtually any value that provides guidance on when to accept a message from the message sender. For example, in one embodiment, the upper threshold value is approximately 0.5. Thus, if composite trust CT is greater than about 0.5, the message sender is determined to have a sufficient level of trust by the intended recipient, and processing branches to block 818. At block 818, the message is forwarded to the intended recipient. Process 800 then returns to a calling process to perform other actions.

If, however, composite trust CT is determined, at decision block 810, to not be greater than the upper threshold, processing continues to decision block 812. At decision block 812, a determination is made whether composite trust CT is below a lower threshold. The lower threshold need not be symmetric with the upper threshold, and virtually any value may be selected that provides guidance on when to reject a received message based on insufficient trust. The lower threshold may also be symmetric, however, and in one embodiment, it is set to about −0.5. Thus, if it is determined that composite trust CT is less than the lower threshold, then the sending message address is assumed to be a spammer, unwanted, unsolicited message sender, and the like. Processing branches to block 820, where the message is processed as though it was spam. For example, the message may be delivered to a bulk folder associated with the recipient message address. The message may also be dropped, deleted, and the like. In any event, upon processing the message, process 800 returns to the calling process to perform other actions.

If, however, at decision block 812, composite trust CT is not less than the lower threshold, that is, if composite trust CT is between the upper and lower thresholds, processing proceeds to block 814, where a spam filter may be applied to the message. Virtually any spam filtering mechanism may be employed, including, but not limited to, content checking, checking for forged message addresses, and the like.

Processing then proceeds to decision block 816, where a determination is made, based on a result from block 814, whether the message is detected as spam. If it is determined that the message is not spam, processing branches back to block 818, where the message is delivered to the intended recipient, as described above. Otherwise, processing branches to block 820, to proceed as described above. In any event, upon completion of processing, process 800 returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for communicating a message over a network, comprising: receiving the message from a sending message address;
   determining a message address relationship trust between the sending message address and a destination message address for the received message;
   determining a universal trust rating for the sending message address, wherein the universal trust rating is a property of the sending message address, and not a property of the destination message address; and
   if at least a combination of the message address relationship trust and the Universal trust rating indicate that the received message is trustable, providing the message to an inbox associated with the destination message address.

2. The method of claim 1, wherein the combination further comprises at least one of a sum, and a weighted sum of the message address relationship trust and the universal trust rating.

3. The method of claim 1, wherein determining the universal trust rating further comprises modifying the universal trust rating for the sending message address based, in part, on another universal trust rating associated with the destination message address.

4. The method of claim 1, wherein determining the message address relationship trust further comprises determining a degree of separation between the sending message address and the destination message address.

5. The method of claim 4, wherein determining the degree of separation further comprises employing an address relationship graph.

6. The method of claim 1, wherein determining the message address relationship trust further comprises employing a relationship strength between the sending message address and the destination message address.

7. The method of claim 1, wherein if at least a combination further comprises:
   if at least the combination is greater than an upper threshold, indicating that the received message is trustable; and
   if at least the combination is less than a lower threshold, indicating that the received message is untrustable.

8. The method of claim 1, wherein determining the universal trust rating further comprises:
   determining another universal trust rating associated with the destination message address;
   determining another message address relationship trust between the destination message address and the sending message address; and
   employing the other universal trust rating and other message address relationship trust to determine the universal trust rating for the sending message address.

9. The method of claim 1, wherein determining if at least the combination is trustable further comprises determining if at least the combination is above a threshold.

10. The method of claim 1, further comprising:
    if at least the combination is determined to be untrustable, performing a response that includes at least one of deleting the message, forwarding the message to a predetermined folder, and rejecting the message.

11. The method of claim 1, further comprising:
    if at least the combination is determined to be between an upper threshold and a lower threshold, inclusive, performing a spam detection on at least a part of a content of the message.

12. The method of claim 1, wherein determining the universal trust rating further comprises determining the universal trust rating based, in part, on an online activity associated with at least one of sending a message, forwarding a message, deleting a message, blocking a message, responding to a message, marking a message as spam, marking a message as not spam, and saving a message address.

13. A server for communicating a message over a network, comprising:
   a datastore that is configured to store trust information; and
   a trust manager, coupled to the datastore, that is configured to perform actions, including:
      receiving the message from a sending message address;
      determining a message address relationship trust between the sending message address and a destination message address, in part, from the stored trust information;
      determining a universal trust for the sending message address, wherein the universal trust rating is a property of the sending message address, and not a property of the destination message address; and
      if at least a combination of the message address relationship trust and the universal trust rating indicate that the received message is trustable, providing the message to an inbox associated with the destination message address.

14. The server of claim 13, wherein the combination further comprises a sum of the message address relationship trust and the universal trust rating.

15. The server of claim 13, wherein determining the universal trust rating further comprises modifying the universal trust rating for the sending message address based, in part, on another universal trust rating associated with the destination message address.

16. The server of claim 13, wherein determining the message address relationship trust further comprises determining a degree of separation between the sending message address and the destination message address.

17. The server of claim 13, wherein determining the message address relationship trust further comprises employing a relationship strength between the sending message address and the destination message address.

18. A system for communicating a message over a network, comprising: a client device that is configured to perform actions, including: registering a destination message address with a trust server; and the trust server, coupled to the client device, that is configured to perform actions, including: storing the registered destination message address in a datastore;
   receiving the message from a sending message address;
   determining a message address relationship trust between the sending message address and the destination message address, in part, from the datastore;
   determining a universal trust rating for the sending message address, wherein the universal trust rating is a property of the sending message address, and not a property of the destination message address; and
   if at least a combination of the message address relationship trust and the universal trust rating indicate that the received message is trustable, providing the message to an inbox associated with the destination message address.

19. The system of claim 18, wherein the trust server is configured to perform actions, further comprising:
   if at least the combination is determined to be untrustable, performing a response that includes at least one of deleting the message, forwarding the message to a predetermined folder, and rejecting the message.

20. The system of claim 18, wherein the trust server is configured to perform actions, further comprising:
   if at least the combination is determined to be between an upper threshold and a lower threshold, inclusive, performing a spam detection on at least a part of a content of the message.

21. The system of claim 18, wherein determining the universal trust rating further comprises determining the universal trust rating based, in part, on an online activity associated with at least one of sending a message, forwarding a message, deleting a message, blocking a message, responding to a message, marking a message as spam, marking a message as not spam, and saving a message address.

22. A computer-readable medium having computer-executable instructions for communicating a message over a network, the computer-executable instructions being operative to perform actions, comprising: receiving the message from a sending message address over the network;
   determining a message address relationship trust between the sending message address and a destination message address for the message;
   determining a universal trust rating associated with the sending message address, wherein the universal trust rating is a property of the sending message address, and not a property of the destination message address; and
   if at least a combination of the message address relationship trust and the universal trust rating indicate that the received message is trustable, providing the message to an inbox associated with the destination message address.

23. The computer-readable medium of claim 22, further comprising:
   if at least the combination is determined to be untrustable, performing a response that includes at least one of deleting the message, forwarding the message to a predetermined folder, and rejecting the message.

24. The computer-readable medium of claim 22, further comprising:
   if at least the combination is determined to be between an upper threshold and a lower threshold, inclusive, performing a spam detection on at least a part of a content of the message.

25. The computer-readable medium of claim 22, wherein determining the universal trust rating further comprises determining the universal trust rating based, in part, on an online activity associated with at least one of sending a message, forwarding a message, deleting a message, blocking a message, responding to a message, marking a message as spam, marking a message as not spam, and saving a message address.

26. A server for communicating a message on a network, comprising: a means for receiving the message from a sending message address;
   a means for determining a message address relationship trust between the sending message address and a destination message address for the received message;
   a means for determining a universal trust rating for the sending message address, wherein the universal trust rating is a property of the sending message address, and not a property of the destination message address; and
   if at least a combination means of the message address relationship trust and the universal trust relationship rating indicate that the received message is trustable, a means for providing the message to an inbox associated with the destination message address.

27. The method of claim 1, wherein determining the universal trust rating further comprises:
  determining a message domain associated with the sending message address;
  determining a domain universal trust rating associated with the message domain; and
  employing the domain universal trust rating as the universal trust rating for the sending message address.

28. The method of claim 1, wherein determining the universal trust rating further comprises determining the universal trust rating for the sending message address based on a weighted average of universal trust ratings for message addresses within a community of message addresses.

29. The method of claim 1, further comprising:
  determining universal trust ratings for each message address within a community of message address, wherein the universal trust ratings for the community evolves to a self-consistent state over time.

30. The method of claim 29, wherein the self-consistent state further comprises the universal trust ratings of each message address within the community migrating into one of three clusters consisting of a good cluster, a bad cluster, and an unknown cluster of universal trust rating values.

* * * * *

UNITED STATES PATENT AND TRADEMARK OFFICE
CERTIFICATE OF CORRECTION

PATENT NO. : 7,155,738 B2 Page 1 of 1
APPLICATION NO. : 10/886891
DATED : December 26, 2006
INVENTOR(S) : Jing Zhu et al.

It is certified that error appears in the above-identified patent and that said Letters Patent is hereby corrected as shown below:

Column 4; Line 35; Delete "Lihes" and insert -- Lines --, therefor.

Column 10; Line 65 (Approx.); Delete "UT(B(A,B)>0)." and
Insert -- UT(B)<0 and T(A,B)>0). --, therefor.

Column 17; Line 16 (Approx.); In Claim 13, after "trust" insert -- rating --.

Signed and Sealed this

Tenth Day of April, 2007

JON W. DUDAS
*Director of the United States Patent and Trademark Office*